April 1, 1930.  W. W. WILSON  1,753,077
TRUNK AND LUGGAGE RACK
Original Filed Sept. 16, 1929
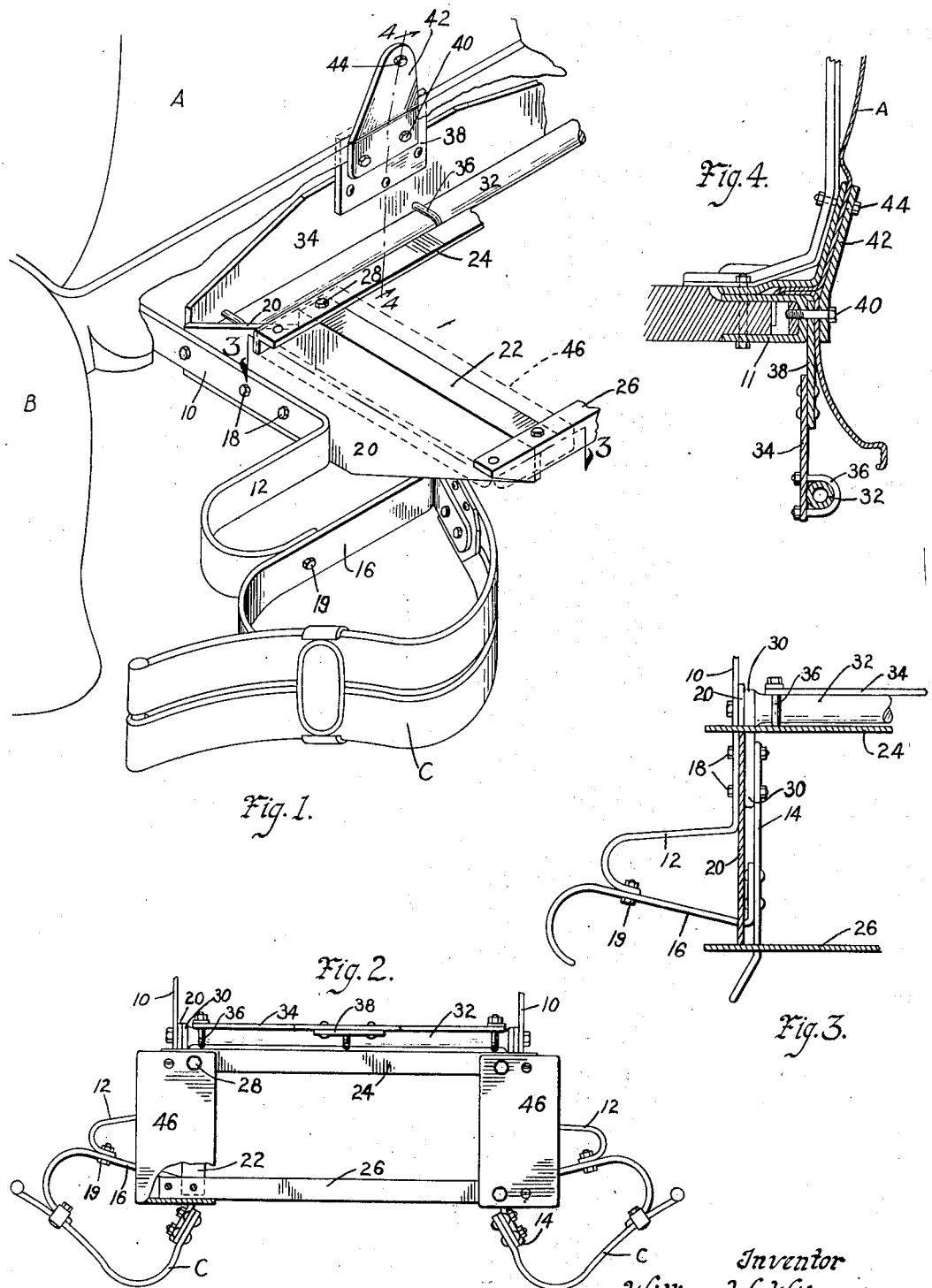
Inventor
William W. Wilson
by Bair, Freeman & Sinclair
Attorneys.
Witness
Ralph Collins Patented Apr. 1, 1930

1,753,077

UNITED STATES PATENT OFFICE

WILLIAM W. WILSON, OF SIOUX CITY, IOWA, ASSIGNOR TO KARI-KEEN MANUFACTURING COMPANY, INC., A CORPORATION OF DELAWARE

TRUNK AND LUGGAGE RACK

Original application filed September 16, 1929, Serial No. 392,960. Divided and this application filed October 19, 1929. Serial No. 400,876.

This invention relates to an automobile trunk and luggage rack adapted for attachment to the rear end of an automobile, the parts being simple, durable and comparatively inexpensive.

The present application is a division of my application Serial No. 392,960, filed September 16, 1929, on a trunk rack.

An object of the invention is to provide a trunk and luggage rack which is especially applicable for use on automobiles having rearwardly extending bumper arms or bars such as in the Ford automobile of the 1928 model; the present invention contemplating the use of such bumper arms as a means of attachment for the trunk and luggage rack and at the same time providing a support for bumper elements.

Still a further object is to provide a trunk and luggage rack structure adapted to be supported at its ends upon members projecting rearwardly from the automobile body or frame and adapted for connection intermediate its ends to the body portion of the automobile so that the trunk and luggage rack is supported both at its ends and at a point intermediate its ends.

It may be here mentioned that in the Ford automobile of the 1928 model, there is provided a spare tire support which consists of a casting rigidly connected to the rear of the automobile body at a point substantially midway between the fenders of the automobile. My trunk and luggage rack is adapted to be supported intermediate its ends by means of a connection extending from the trunk and luggage rack up to the body where the spare tire support normally is positioned.

Another object is to provide a construction in a trunk and luggage rack whereby the rack, while being supported at its ends on brackets extended from the vehicle frame, will also be securely affixed to the vehicle body and to the rear end frame member of the chassis in such manner as to afford a strong and substantial carrier for loads imposed thereon.

Still a further object is to provide bumper adaptors adapted to be positioned upon the bumper bar for projecting the bumper rearwardly a greater distance than the normal distance of the bumper elements so as to accommodate the trunk and luggage rack between the rear of the automobile and the position of the bumper elements.

Another object is to provide a trunk and luggage rack of the character described embodying a frame structure and a means of attachment to the rear end of an automobile which consists of few parts that may be readily constructed and assembled, which may be easily applied, and which is strong and durable.

More particularly it is my object to provide a trunk and luggage rack consisting of side plates for attachment to bumper support elements, transverse means for connection between the side plates to serve as a carrier for a trunk and luggage rack, an intermediate supporting means consisting of a plate to be attached to a cross member normally extending between the bumper support elements on opposite sides of an automobile, the central portion of such plate being connected with the back of the automobile adjacent the center thereof by bolts extending into said openings provided for normally supporting a tire carrier.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a fragmentary perspective view of one end of the trunk and/or luggage rack, showing the manner of mounting the same upon an automobile with the bumper member attached rearwardly of the trunk and/or luggage rack.

Figure 2 is a top plan view of my trunk and luggage rack structure.

Figure 3 is a detail sectional view taken on line 3—3 of Figure 1.

Figure 4 is a detail sectional view taken on line 4—4 of Figure 1, illustrating one of the intermediate attaching members between the trunk and/or luggage rack structure and the body of the automobile.

In the accompanying drawings, I have used the reference character A to indicate generally, the body of an automobile and B the fenders thereof. The body A includes a chassis or under-frame 11.

My trunk and/or luggage rack structure is composed of structural steel parts, that is angle irons and flat plates so connected together as to provide a rigid unit.

The ordinary Ford car of the 1928 type includes a pair of rearwardly extending bumper bars or supports 10. The supports 10 have their outer ends curved outwardly as at 12 and bumper elements C are connected to the straight portion of the bumper bar 10 and to the outwardly curved portion 12.

When my trunk and/or luggage structure is used, it is necessary to provide an adaptor for positioning the bumper elements C rearwardly a greater distance than their normal position relative to the rear of the automobile body.

The adaptors include a straight element of strap material 14 and an outwardly projecting portion 16. The straight portion 14 is bolted to the bumper support 10 by means of a pair of bolts 18. The bolts 18 are those normally provided for connecting the bumper element C to the support 10.

The portion 16 of the adaptor is bolted to the portion 12 of the bumper support 10 by a bolt 19. The ends of the straight portion 14 and of the curved portion 16 are provided with bolt holes or openings so that the bumper element C may be secured thereto by the use of bolts. It will thus be seen that the adaptor composed of the parts 14 and 16 does nothing more than place the position of the bumper element C a greater distance rearwardly than that of the automobile body proper.

The trunk and luggage rack structure includes a pair of side plates 20 having inturned flanges 22. The side plates 20 are secured together by a pair of angle bars 24 and 26. Bolts 28 are used to connect the angle bars 24 and 26 to the flanges 22 of the side plates 20. The side plates 20 are adapted to be connected to the bumper bar 10 by means of the bolts 18.

The portion 14 of the adaptor is secured to the bumper bar 10 on one side of a foot member 30 and the side plate 20 on the other side thereof, all three of these members being secured to the bumper bar 10 on the inside, as best shown in Figure 3 of the drawings. A foot member 30 of course is provided for each bumper bar 10 as shown in Figure 2, and a pipe or brace extends between the foot members 30.

In order to connect the trunk or luggage rack structure to the body of the automobile, I provide a plate 34 which is vertically arranged and connected to the pipe 32 by several U bolts 36. Extending upwardly from the plate 34 is a fitting 38. The fitting 38 is provided with a pair of openings adapted to receive bolts or screws 40.

An auxiliary cover plate 42, substantially triangular in outline, is positioned on the back of the automobile body and connected thereto by the bolts 40 as well as a third bolt 44. The bolts 40 and 44 project into and connect with the body at the point where the normal tire carrier and support is provided. The tire carrier of course is removed so that the trunk and luggage rack structure could be thus supported. In the event that the tire carrier does not interfere with the luggage carrier on the rack the tire carrier can be replaced by using longer bolts 40 and 44.

It will be noted that the bolts 40 project through the cover plate 42 as well as the fitting 38. It will thus be seen that through the medium of the plate 34 and fitting 38, I connect the trunk and luggage rack structure intermediate its ends to the body of the automobile. The ends of the angle-iron cross members 24 and 26 project beyond the side plates 20 and I provide a cover element 46 as clearly illustrated in Figure 2 of the drawings. This cover plate is indicated by dotted lines in Figure 1, and one is provided for each end of the rack structure.

It will be noted that my trunk and luggage rack structure is adapted to be secured to an automobile and to cooperate with the bumper supports thereof which serve as a means of connection and support for the structure. The structure is thus supported on its ends on the rearwardly extending members 10 and at its center by the plates which are adapted to be secured to the automobile body at the position where the spare tire carrier is normally attached. The central or intermediate support in conjunction with end supports on the bumper bar 10 provide a very rigid supporting construction for a trunk and luggage rack on the carrier.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with an automobile having a pair of rearwardly extending bumper supporting arms, a carrying rack comprising a pair of side plates secured to said arms and extending upwardly therefrom, transverse means of connection between said plates to serve as the carrier, a brace rod extending between said bumper supporting arms, an intermediate supporting element connected to the automobile body and extending in opposite directions therefrom towards the ends of said brace rod whereby the carrier is braced and supported through the medium of said brace rod and connection with the intermediate portion of the automobile body.

2. In combination with an automobile having a pair of rearwardly extending bumper supporting arms, a carrying rack comprising a pair of side plates secured to said arms and extending upwardly therefrom, transverse means of connection between said plates to serve as the carrier, a brace rod extending between said bumper supporting arms, an intermediate supporting element connected to the automobile body and extending in opposite directions therefrom towards the ends of said brace rod and supportingly associated with the ends of said carrier structure whereby the carrier is additionally supported by its connection with the intermediate portion of the automobile body.

3. In combination with an automobile having a pair of rearwardly extending bumper supporting arms, a carrying rack comprising a pair of side plates secured to said arms and extending upwardly therefrom, transverse means of connection between said plates to serve as the carrier, a brace rod extending between said bumper supporting arms, an intermediate supporting element connected to the automobile body and extending in opposite directions therefrom towards the ends of said brace rod and means of connection between said supporting element and said brace rod.

4. In combination with an automobile having a pair of rearwardly extending bumper supporting arms, a carrying rack comprising a pair of side plates secured to said arms and extending upwardly therefrom, transverse means of connection between said plates to serve as the carrier, a brace rod extending between said bumper supporting arms, an intermediate supporting element connected to the automobile body and to said brace rod whereby the brace rod is supported and the ends thereof support the bumper supporting arms and the carrying rack.

5. In combination with an automobile having a pair of rearwardly extending members projecting from the side frame members thereof and a brace rod connecting said pair of members together intermediate their ends, a carrying structure adapted to be supported at its ends on said rearwardly extending members and an additional support for said carrying structure connected intermediate its end to the rear central portion of the automobile body and projecting downwardly and outwardly from its point of connection with the automobile in substantial alignment with said brace rod.

6. In combination with an automobile having a pair of rearwardly extending members, a trunk rack structure comprising a pair of transversely arranged supporting bars, and elements connecting the ends of said bars together, said end elements being secured to said rearwardly extending members and supported thereby, a brace rod between the ends of said members and an intermediate support for said trunk rack, said intermediate support being secured to the back of said automobile body and to said brace rod for supporting the brace rod and thereby the trunk rack.

7. In combination with an automobile having a pair of rearwardly extending members, a trunk rack structure comprising a pair of transversely arranged supporting bars, and elements connecting the ends of said bars together, said end elements being secured to said rearwardly extending members and supported thereby, an intermediate brace support for said trunk rack, said intermediate support being secured to the back of said automobile body and to said brace rod for supporting the brace rod and thereby the trunk rack, the connection of said intermediate support to said brace rod being by U-bolts.

8. In combination with an automobile having a pair of rearwardly extending members projecting from the frame members thereof, a carrying structure adapted to be supported at its ends on said rearwardly extending members, and an additional support for said carrying structure connected intermediate its ends to the rear central portion of the automobile body and projecting downwardly and outwardly from its point of connection with the automobile and adapted to support said rearwardly extending members intermediate their ends.

9. In combination with an automobile having a pair of rearwardly extending supporting arms, a carrying rack comprising a pair of side plates secured to said arms and extending upwardly, transverse means of connection between said plates to serve as the carrier, and an additional support for said carrying rack connected intermediate its ends to the rear central portion of the automobile body projecting downwardly and outwardly from its point of connection with the automobile and adapted to support said rearwardly extending members intermediate their ends.

WILLIAM W. WILSON.